United States Patent [19]

Marie

[11] 3,939,132
[45] Feb. 17, 1976

[54] PROCESS FOR THE PREPARATION OF RANDOM COPOLYMERS OF MONO-OLEFINS OR OF MONO-OLEFINS AND UNCONJUGATED DIENES WITH UNSATURATED DERIVATIVES SELECTED FROM N-VINYLIMIDAZOLES AND N-VINYLIMIDAZOLINES

[75] Inventor: Gilbert Marie, Pau, France

[73] Assignee: Societe Nationale des Petroles d'Aquitaine, Courbevoie, France

[22] Filed: Apr. 11, 1974

[21] Appl. No.: 460,079

[30] Foreign Application Priority Data
Apr. 12, 1973  France .............................. 73.13307

[52] U.S. Cl.... 260/80.72; 260/33.6 UA; 260/42.29; 428/461; 428/462
[51] Int. Cl.$^2$. C08F 210/00; C08F 4/06; C08F 4/42
[58] Field of Search............. 260/80.72; 450/725.5; 428/461, 462

[56] References Cited
UNITED STATES PATENTS
3,821,172    6/1971    Sugiura et al..................... 260/80.72

Primary Examiner—Stanford M. Levin
Attorney, Agent, or Firm—Burgess Ryan and Wayne

[57] ABSTRACT

A process is described for the preparation of substantially linear, amorphous random copolymers of mono-olefins or mono-olefins and unconjugated dienes with unsaturated nitrogen derivatives selected from N-vinylimidazoles and N-vinylimidazolines and compounds derived from them by substitution, for the hydrogen atoms fixed to the carbons in the heterocycle, of hydrocarbon or aminohydrocarbon radicals.

At least two mono-olefins containing 2 to 20 carbon atoms, and possibly an unconjugated diene, are placed in contact, in an inert liquid medium at a temperature of between $-80°$ and $+150°C$, with at least one of these nitrogen derivatives in the form of a complex with a Lewis acid, in the presence of a co-ordination catalyst system.

The resulting copolymers can be vulcanized, and among other properties have excellent adherence to metal surfaces.

28 Claims, No Drawings

PROCESS FOR THE PREPARATION OF RANDOM COPOLYMERS OF MONO-OLEFINS OR OF MONO-OLEFINS AND UNCONJUGATED DIENES WITH UNSATURATED DERIVATIVES SELECTED FROM N-VINYLIMIDAZOLES AND N-VINYLIMIDAZOLINES

This invention concerns a process for the preparation of new random copolymers, substantially linear and amorphous copolymers, of mono-olefins, particularly alpha-olefins, or mono-olefins and non-conjugated dienes, with unsaturated derivatives selected from N-vinylimidazoles and N-vinylimidazolines. It also concerns the new copolymers thereby obtained, and elastomers produced by vulcanizing these copolymers..

Amorphous copolymers of mono-olefins, particularly ethylene and propylene, or mono-olefins and non-conjugated dienes, such as ethylene, propylene and dicyclopentadiene or ethylidenenorbornene, are known in the existing art, and they are prepared by polymerization techniques using co-ordination catalysis, involving catalysts formed by the combination of compounds of transition metals in columns IV to VIII of the periodic table of elements with organometallic compounds of elements in columns I to III of this table. These amorphous copolymers can be vulcanized to produce elastomers with good mechanical properties, notably tensile strength and elasticity, and which can accordingly be used to make objects which must combine flexibility with mechanical strength, such as sheaths for electric cables, conveyor belts, pipes for industrial purposes, sealing rings or other such objects.

It has been suggested that certain properties of these copolymers could be improved by incorporating therein relatively small quantities of groups from unsaturated polar derivatives, particularly N-alkenylic nitrogen derivatives, in their chains. This is done by copolymerizing the unsaturated polar derivatives with mono-olefins, and possibly non-conjugated dienes, using co-ordination catalysis techniques for the preparation of amorphous copolymers of mono-olefins or mono-olefins and unconjugated dienes.

These unsaturated polar derivatives, which show varying degrees of polarity, react with varying degrees of intensity to the components of the co-ordination catalyst, particularly the organometallic compounds; to prevent copolymerization from being inhibited, unsaturated polar derivatives for copolymerizing with mono-olefins and possibly unconjugated dienes must possess certain characteristics, and in certain cases the amount in the polymerization mixture must be limited.

N-alkenylic nitrogen derivatives used in existing processes as unsaturated polar derivatives suitable for copolymerization with mono-olefins by co-ordination catalysis to produce amorphous copolymers are either derivatives in which the nitrogen atom shows low reactivity, particularly as the result of major steric hindrance, for example vinylcarbazole or N-N-di-isopropyl-3-butenylamine, in which case, copolymerization is performed without any special precautions, or derivatives in which the nitrogen atom does not show any steric hindrance, but on the other hand bears an alkenyl radical, the double bond of which is at least in a position $\beta$ in relation to the nitrogen atom, in which case the molar proportion of this nitrogen derivative in the polymerization mixture is less than the proportion of organometallic derivatives in the catalytic system in the same mixture.

This means that amorphous copolymers of mono-olefins containing groups bearing imidazolyl or similar radicals in their chains can be produced by co-ordination catalysis only by copolymerizing them with mono-olefins of N-alkenylimidazoles or similar substances containing an alkenyl radical with unsaturated end bonds, and containing at least four carbon atoms, and also by ensuring that there is always less than 1 mole of N-unsaturated derivative per mole of organometallic compound in the catalytic system.

Apart from the need for precise checking of the proportion of N-alkenylimidazole or similar derivatives to be copolymerized with the mono-olefins, these requirements also rule out the use of N-vinylimidazole-type derivatives. This represents a serious drawback, since such derivatives are easily available on the market, and their use could mean a considerable reduction in industrial production costs for amorphous mono-olefin copolymers containing groups bearing imidazolyl or similar radicals.

The new process proposed in this invention removes these restrictions, and allows co-ordination catalysis to be used to produce copolymers of mono-olefins or mono-olefins and non-conjugated dienes with unsaturated nitrogen derivatives selected from N-vinylimidazoles and N-vinylimidazolines; such catalysis had never previously been used.

The new process described in this invention for the preparation of substantially linear, amorphous, random copolymers of mono-olefins, or mono-olefins and unconjugated dienes, with unsaturated nitrogen derivatives selected from N-vinylimidazoles and N-vinylimidazolines and compounds deriving from them by substitution, for the hydrogen atoms fixed to the heterocycle carbons, of hydrocarbon or aminohydrocarbon radicals, is characterized by the fact that at least two mono-olefins containing from 2 to 20 carbon atoms in their molecule, and possibly an unconjugated diene, are placed in contact, in an inert liquid medium at a temperature of between $-80°$ and $+150°C$, with at least one of these unsaturated nitrogen derivatives in the form of a complex with a Lewis acid, and in the presence of a catalyst system formed by the combination of an organometallic compound of at least one element in columns I, II or III of the periodic table of elements with a compound of a transition metal in columns IV to VIII of the periodic table, until a copolymer forms.

Recommended mono-olefins for use in this new process are alpha-olefins with the formula $R\text{-}CH = CH_2$, where R is hydrogen or an alkyl radical containing 1 to 18 carbon atoms, such as ethylene, propylene, 1-butene, 1-pentene, 4-methyl-1-pentene, 1-hexene, 1-octene, 1-decene and 1-hexadecene; ethylene is preferably used in combination with an alpha-olefin containing 3 to 8 carbon atoms, and particularly with propylene or 1-butene.

Unconjugated dienes used in this new process can be linear or cyclic, and comprise in particular, 1,4-hexadiene, 2-methyl-1,4-pentadiene, 1,4-cycloheptadiene, 1,5-cyclo-octadiene, 4,7,8,9-tetrahydroindene, [3,2,0]-bicyclo-2,6-heptadiene, and norbornene derivatives such as dicyclopentadiene, 5-alkylidene-2-norbornene, for example 5-methylene 2-norbornene and 5-ethylidene-2-norbornene.

Unsaturated nitrogen derivatives that can be polymerized in this new process with mono-olefins, or mono-olefins and unconjugated dienes, comprise N-vinylimidazoles and N-vinylimidazolines, as well as compounds derived from them by substitution, for the hydrogen atoms fixed to the heterocycle carbons, of hydrocarbon radicals from the group comprising monovalent alkyl, aryl, aralkyl and alkaryl radicals, or their amino derivatives, containing 1 to 8 carbon atoms, or by substitution, for the hydrogen atoms in the two adjacent carbons to the heterocycle, of a divalent hydrocarbon or aminohydrocarbon radical, containing 4 to 8 carbon atoms and forming a hydrocarbon nucleus with the adjacent carbon atoms to the heterocycle, particularly an aromatic nucleus. These unsaturated nitrogen derivatives include, among others, N-vinylimidazoles, namely 1-vintlimidazole, N-vinyl-2-methyl imidazole, N-vinyl-2-ethyl imidazole, N-vinyl-2-phenyl imidazole, N-vinyl-2,4-dimethyl imidazole, N-vinylbenzimidazole, N-vinyl-2-methyl benzimidazole, and N-vinylimidazolines, namely 1-vinylimidazoline, N-vinyl-2-methyl imidazoline, N-vinyl-2-phenyl imidazoline.

The resulting copolymers are amorphous and substantially linear, and their molecular weight of at least 5,000 is high enough to remain solid at ordinary temperatures. They can be vulcanized by means of free-radical generators such as peroxides, or by sulphur vulcanization systems when they contain groups derived from an unconjugated diene. The presence in such copolymers of heterocyclic radicals derived from imidazole or imidazoline gives them good adherence to metals, after vulcanization, so that they are suitable for use in making, among other things, sealing joints between metal parts, or coatings for metal surfaces. They also ensure compatibility in mixtures of incompatible elastomers.

Copolymers produced by this new process contain 99.9 to 80 percent, and preferably 99.8 to 85 percent weight of non-polar groups derived from at least two mono-olefins containing 2 to 20 carbon atoms in their molecule, and possibly an unconjugated diene, and 0.1 to 20 percent, and preferably 0.2 to 15 percent weight of polar groups derived from at least one unsaturated nitrogen derivative selected from N-vinylimidazoles and N-vinylimidazolines, and compounds derived from them by substitution, for the hydrogen atoms fixed to the heterocycle carbons, of hydrocarbon or aminohydrocarbon radicals, as described above.

In one recommended embodiment, the mono-olefins constituting non-polar groups with the unconjugated diene, if any, are alpha-olefins with the formula R-CH=CH$_2$, where R is hydrogen or an alkyl containing 1 to 18 carbon atoms, and particularly ethylene, combined with an upper alpha-olefin containing 3 to 8 carbon atoms, notably propylene or 1-butene.

In copolymers containing ethylene, the minimum ethylene content is not of critical importance, but the upper limit is 75 percent of the weight of copolymer, to prevent polythene-type crystallinity. The proportion of the second mono-olefin, such as propylene or 1-butene, or of the second mono-olefin and unconjugated diene, can be from 5 to 75 percent of the weight of copolymer, and the unconjugated diene content can be up to 20 percent of the weight of copolymer. The content of polar groups is from 0.1 to 20 percent, and preferably 0.2 to 15 percent, of the weight of copolymer.

In this new process, the unsaturated nitrogen derivatives from which polar groups in the copolymer are derived are copolymerized with the mono-olefins and unconjugated dienes, if any, in the form of complexes with Lewis acids. A Lewis acid is regarded as any compound acting as acceptor of an electron doublet, in this case the electron doublet of the basic nitrogen atom in the unsaturated nitrogen derivative. Lewis acids that can be used to complex unsaturated nitrogen derivatives for this process include, among others, alkyl aluminium dihalides such as ethyl-aluminium dichloride and ethyl-aluminium dibromide; aluminium trihalides such as aluminium trichloride and aluminium tribromide; boron halides such as boron trichloride and boron trifluoride etherate; tin halides such as tin tetrachloride and tin tetrabromide, and nickel halides such as nickel dichloride. As a rule, the compound acting as a Lewis acid for the unsaturated nitrogen derivative is selected so that the complex it forms with the derivative has greater stability than the reaction products that it may form with the components of the co-ordination catalyst system used in copolymerization. The complex between the Lewis acid and unsaturated nitrogen derivative can be preformed before being added to the polymerization mixture; in this case the nitrogen derivative and Lewis acid are dissolved in an inert solvent, preferably the liquid used as the polymerization medium, which is kept at a suitable temperature, for example −80° to +80°C. The complex can also be formed in situ in the polymerization mixture, before or during polymerization. The molar proportion of Lewis acid used to form the complex must be at least equal to the stoichiometric quantity, and may be as much as four times this amount. The quantity is preferably such that the molar ratio of Lewis acid to unsaturated nitrogen derivative is between 1 and 3.

Particularly suitable catalyst systems for the preparation of copolymers by this new process are formed by the combination of organic compounds of aluminium with titanium, vanadium, tungsten or zirconium derivatives, such as halides, oxyhalides, compounds in which at least one of the valencies of the transition metal is saturated by a heteroatom, particularly oxygen or nitrogen, linked to an organic group, such as acetyl acetonates, benzoyl acetonates and alcoholates.

In certain cases, it may be preferable to use a complex of the transition metal derivative with a ligand selected from aliphatic ethers such as diethylic and dipropylic ethers, diethoxyethane, cyclic ethers such as tetrahydrofurane, dioxane, thioethers, phosphines, arsines, tertiary amines such as trimethylamine, methyldiethylamine, heterocyclic nitrogen bases such as pyridine, quinoline, β-diketones, ketoesters, hydroxyaldehydes, aminoaldehydes and aminoalcohols.

One particularly recommended catalyst system contains an organoaluminium compound with the formula $AlY_nCl_{(3-n)}$, where n is a number equalling 1, 3/2, 2 or 3, and Y is a lower alkyl radical such as ethyl, propyl, isobutyl or hexyl, combined with a titanium halide such as TiCl$_4$, or a vanadium halide or oxyhalide such as VCl$_4$ or VOCl$_3$, or vanadium acetylacetonate. These titanium or vanadium halides can be complexed by tetrahydrofurane, an aliphatic ether, tertiary amine, pyridine or quinoline.

The catalyst may be deposited on an organic or inorganic carrier, or chemically bonded to it.

The catalyst system may also contain a certain proportion of activator, such as an alkoxyalkyl halosulphide or halosulphate, such as ethoxyethyl chlorosulphide or chlorosulphate, a halosulphonyl thiophene such as di-2,4- (chlorosulphonyl) thiophene, or a dichloroarylphosphine such as dichlorophenylphosphine.

To form the catalyst system, the organometallic compound and transition metal compound may be mixed or left separate before being added to the polymerization mixture. Premixed catalyst may be added to the polymerization mixture continuously or intermittently.

The activator, if any, may be mixed with the catalyst before being added to the polymerization mixture. It can also be added direct to the mixture during polymerization, continuously or in fractions. In another method, the activator is first mixed with the transition metal compound.

The quantities of organometallic and transition metal compounds in the catalyst system are such that the ratio of the number of metal atoms in the organometallic compound to the number of transition metal atoms in the transition metal compound is between 1 and 50, and preferably between 2 and 30.

The quantity of activator can vary widely, such as from 0.5 to 25 moles of activator per transition metal atom, but the polymerization mixture must contain more organometallic compound, expressed in metal atoms, than activator molecules.

The inert liquid medium (namely a medium that will not affect the components of the catalyst system or the complex between the unsaturated nitrogen derivative and the Lewis acid), in which copolymerization takes place, is preferably an aliphatic, aromatic or cycloaliphatic hydrocarbon, such as heptane, hexane, cyclohexane or benzene, or mixtures of these solvents. Inert halogenated hydrocarbons can also be used, such as chloroform, chlorobenzene and tetrachloroethylene. Olefins themselves can act as a liquid polymerization medium, and copolymerization can be performed in the olefin or one of the olefins to be copolymerized, used in liquid form.

Recommended temperatures for polymerization are between −30° and +100°C, while pressures can range for example from 1 to 50 atmospheres, or even more.

All of the complex between the unsaturated nitrogen derivative and Lewis acid can be added to the polymerization mixture before the catalyst system is added, or during polymerization, continuously or intermittently. The proportion of complex in the polymerization mixture compared with the proportion of organometallic derivative in the catalyst system, is not of critical importance, and can be much greater.

Copolymerization can be performed continuously, in which case the inert liquid medium, olefins, complexed unsaturated nitrogen derivative, unconjugated diene if any, and catalyst system, are fed continuously into the reactor, at rates such that the length of time they remain in the reactor is sufficient to obtain the necessary concentration of copolymer in the reactive mixture.

During copolymerization, the reaction mixture is deprived of free oxygen, as already known in the previous art, by a flow of inert gas, such as nitrogen, before polymerization begins.

The time required for copolymerization generally varies depending on operating conditions, and is usually between 20 minutes to 4 hours.

After copolymerization, the catalyst is destroyed by some method known in the previous art, such as by adding an alcohol to the reaction mixture. The copolymer is then separated from the solvent by coagulation with an alcohol, by stripping with steam, or by any other method for isolating a polymer from solutions containing it.

The invention is illustrated by the following examples, without being confined to them.

EXAMPLE 1

Copolymerization was performed in a cylindrical glass reactor with an inside diameter of 10 cm and a capacity of 2,000 milliliters. It was equipped with a stirring system, a dropping funnel to inject the nitrogen monomer, two dropping funnels to inject the catalyst system, and gas inlet and outlet tubes. The reactor was submerged in a heat-controlled bath and its temperature was kept at 30°C throughout copolymerization.

The funnels on top of the reactor were swept out in order to establish a nitrogen atmosphere in them. 25 millimoles of a complex of N-vinylimidazole and ethylaluminium dichloride, dissolved in 40 milliliters of benzene, prepared by simply mixing N-vinylimidazole and ethyl aluminium dichloride in a molar ratio of 1:1 in benzene at a temperature of approximately 10°C, were placed in the monomer-inlet funnel.

2 millimoles of vanadium tetrachloride in 40 milliliters of anhydrous heptane were placed in one of the dropping funnels for the catalyst system, and 16 millimoles of ethyl aluminium sesquichloride (½ [$(C_2H_5)_3 Cl_3Al_2$]) in 40 milliliters of anhydrous heptane in the other.

880 milliliters of heptane, which had first been dried and degassed, were placed in the reactor, inside which a nitrogen atmosphere was maintained. The flow of nitrogen was stopped, and a mixture of ethylene and propylene, in a molar ratio of propylene to ethylene of 1.2, was fed in through the gas-inlet tube. This mixture circulated at a rate of 100 normal liters an hour throughout copolymerization. 20 minutes after the gas mixture had begun to be fed in, the complexed nitrogen monomer and catalyst system components were injected drop by drop, each over a period of 40 minutes. Injection of the gases continued for a further 10 minutes, after which copolymerization was halted by adding 50 milliliters of ethanol. The solution was then poured into ethanol to precipitate the copolymer, which was next washed in ethanol and dried in a drier at reduced pressure.

This produced 50 gr of a solid substance with the appearance of an unvulcanized elastomer, amorphous to X-rays, and with a reduced viscosity, measured in decaline at 135°C, of 0.937.

After hot ethanol extraction, the terpolymer was analysed by the Kjeldahl method to determine its nitrogen content, while its propylene and vinylimidazole content were measured by infrared analysis.

The terpolymer contained 0.55 percent weight of nitrogen, corresponding to 1.85 percent vinylimidazole-derived groups (infrared analysis showed 1.9 percent vinylimidazole-derived groups), 48.7 percent propylene-derived groups and 49.45 percent ethylene-derived groups.

If the test is repeated under the same conditions, but using vinylimidazole in a non-complexed form, no polymer forms.

EXAMPLE 2

1.3 liters of dried, degassed heptane were placed in a cylindrical glass reactor with a capacity of 1,500 milliliters, heat-controlled at 30°C, equipped with an anchor stirrer and with apertures at the base to inject the catalyst system components, nitrogen monomer, reaction solvent and olefinic monomers, and at the top an outlet for the reaction solution and residual gas, the introduction of heptane is done after first sweeping out the reactor with nitrogen.

A gas mixture of ethylene and propylene, in a molar ratio of ethylene to propylene of 0.83, was then injected into the reactor for 20 minutes. 1.2 millimoles of $VCl_4$, 8.4 millimoles of ethylaluminium sesquichloride, each diluted in heptane, and 16 millimoles of vinylimidazole complexed by a stoichiometric quantity of ethylaluminium dichloride diluted in benzene, were fed into the reactor, over a period of 40 minutes, using measuring pumps. The olefins were injected continuously. After 40 minutes, the total volume of solution was 1.5 liters.

While injection of the olefins continued, fresh heptane was fed into the base of the reactor, the quantity being such that the total volume of solvent injected, including the solvent used to dilute the components of the catalyst system and complexed monomer, was 1.45 liters in 80 minutes, together with 2.4 millimoles of $VCl_4$ and 16.8 millimoles of ethylaluminium sesquichloride diluted in heptane and 32 millimoles of vinylimidazole complexed by the same molar quantity of ethylaluminium dichloride diluted in benzene, while the copolymer solution was collected continuously through the upper reactor outlet, at the rate of 1.5 liters in 80 minutes. On leaving the reactor, the copolymer solution was mixed with an antioxidant, then washed continuously with an aqueous acid solution to coagulate the copolymer. After three successive 80-minute periods, the total quantity of solution collected was 6 liters, and its copolymer concentration was 6.3 percent in weight.

The resulting terpolymer had the appearance of an unvulcanized elastomer, with reduced viscosity, measured in decaline at 135°C, of 1.09.

This terpolymer contained 0.94 percent weight of nitrogen, namely 3.15 percent vinylimidazole-derived groups, 34.7 percent propylene-derived groups, and 62.15 percent ethylene-derived groups.

A comparative test was done, under the same conditions but without complexing the imidazole. No polymer was obtained.

EXAMPLE 3

Copolymerization was performed in a six-liter reactor similar to the one in Example 1, heat-controlled at 20°C.

The funnels on top of the reactor were swept out with nitrogen to establish a nitrogen atmosphere in them. 100 millimoles of the N-vinylimidazole and ethylaluminium dichloride complex described in Example 1, diluted in 160 milliliters of benzene, were placed in the monomer-inlet funnel.

8 millimoles of $VOCl_3$ in 100 milliliters of anhydrous heptane were placed in one of the dropping funnels for the catalyst system, and 40 millimoles of diethylaluminium chloride in 120 milliliters of anhydrous heptane in the other.

2.6 liters of heptane, which had first been dried and degassed, were placed in the reactor, inside which a nitrogen atmosphere was maintained. The flow of nitrogen was stopped, and a mixture of ethylene and propylene, in a molar ratio of propylene to ethylene of 1.2, was fed in through the gas-inlet tube. This mixture circulated at the rate of 100 normal liters an hour throughout copolymerization. 20 minutes after the gas mixture had begun to be fed in, the complexed nitrogen monomer and the components of the catalyst system were injected drop by drop, each over a period of 100 minutes. Injection of the olefins continued for a further 10 minutes.

When the reaction was over, an antioxidant was added to the reaction mixture, and it was treated with water containing 6 percent weight of citric acid to wash the polymer.

The reaction produced 200 gr of a terpolymer with the appearance of an unvulcanized elastomer, amorphous to X-rays, and with a reduced viscosity, measured in tetraline at 135°C, of 0.924.

The terpolymer contained 0.6 weight of nitrogen, corresponding to 2 percent vinylimidazole-derived groups, 40 percent propylene-derived groups and 58 percent ethylene-derived groups.

The terpolymer was subjected to two vulcanization tests, referred to as VP and VS.

For these tests, two mixtures were prepared, based on the terpolymer and containing the ingredients needed for vulcanization, using a roller mixer. Each mixture was then vulcanized by being heated in a press to a suitable temperature and for a suitable period. The mechanical properties of the resulting vulcanized elastomers were measured.

The composition of the mixture by parts weight, vulcanization temperature and duration, and the mechanical properties of the vulcanized elastomers, are shown in table I below.

Table I

| Type of vulcanization | VP | VS |
|---|---|---|
| Terpolymer | 100 | 100 |
| Colloidal silica (*) | 60 | |
| Carbon black | | 60 |
| Zinc oxide | | 5 |
| Sulphur | | 0.32 |
| 40 % dicumyl peroxide | | 6.75 |
| Perkadox 14/40 (**) | 10 | |
| Vulcanization temperature (°C) | 165 | 160 |
| Length of vulcanization (mins.) | 50 | 60 |
| Mechanical properties | | |
| - tensile strength (kg/cm2) | 157 | 170 |
| - elongation at break (%) | 500 | 430 |
| - Shore A hardness | | 74 |
| - resilience (%) | | 64 |

(*) The colloidal silica used is sold commercially under the name "Aerosil 972".

(**) A commercial preparation containing 40 % bis (t-butylperoxyisopropyl) benzene.

The adhesive force of the vulcanized mixture VP on an aluminium surface was also measured, in comparison with a similar vulcanized mixture in which the terpolymer was replaced by an ethylene and propylene copolymer marketed under the name "Dutral" by the Italian firm Montedison SpA.

This was measured on samples, prepared by hot-pressing (at 185°C) each of the mixtures between 2 aluminium foils 30 mm wide, which had previously been cleaned with trichlorethylene and treated with sulphochromic mixture, so as to provide at one end of the sample a part free of elastomer. Hot pressing was continued for a period of time referred to below as $t_{95}$, corresponding to the time needed to reach 95 percent of the optimum crosslinking couple of the mixture on a Monsanto rheometer. After the hot-pressing phase, the assembly was cooled down, and the samples were subjected to a peeling test to determine the adhesive force.

This test was done using a dynamometer comprising a fixed upper part provided with two rotationally mobile horizontal bars, set slightly apart, and a lower part equipped with jaws and vertically mobile when subjected to a measurable force.

The sample was placed vertically between two bars, elastomer-free and upwards, and the parts of the foils left free were each bent back over the corresponding bar, then gripped in the jaws of the lower part.

This lower part was then moved downwards at a speed of 15 mm per minute, in order to tear the foil away from the elastomer, and the force needed to do this was measured. This force, expressed in kg per cm width of foil, is known as the adhesive force.

The results obtained in the test are shown in table II below.

Table II

| Mixture | $t_{95}$ (mins.) | Adhesive force | Remarks |
| --- | --- | --- | --- |
| Control sample | 7 | 2.6 | very uneven adherence in points |
| VP | 6 | 3.4 | very even homogeneous adherence |

The presence of N-vinylimidazole-derived groups in the ethylene and propylene copolymer chains improves and considerably increases the adherence of the vulcanized polymer on metal substrates.

EXAMPLE 4

The same conditions as those described in Example 1 were applied, except that the N-vinylimidazole and ethylaluminium dichloride complex were replaced by the same molar quantity of a complex obtained by mixing N-vinylbenzimidazole and ethylaluminium dichloride, with a molar ratio of 1:1, at 40°C in benzene.

The reaction produced 43 gr of an amorphous terpolymer with the appearance of an unvulcanized elastomer. It contained 0.4 percent weight of nitrogen, namely 2.8 percent N-vinylbenzimidazole-derived groups, 48 percent propylene-derived groups, and 49.2 percent ethylene-derived groups.

EXAMPLE 5

The same operating conditions were used as in Example 3, except that the N-vinylimidazole and ethylaluminium dichloride complex was replaced by the same molar quantity of a complex obtained by mixing N-vinylimidazoline and ethylaluminium dichloride, with a molar ratio of 1:1, at 30°C in benzene. Polymerization temperature was 30°C.

This produced 190 gr of a terpolymer amorphous to X-rays, and containing 1.9 percent weight of N-vinylimidazoline-derived groups, 41 percent propylene-derived groups and 57.1 percent ethylene-derived groups.

The reduced viscosity of this terpolymer, measured in tetraline at 135°C, was 0.926.

EXAMPLE 6

The conditions applied as those for Example 1, except that the N-vinylimidazole and ethylaluminium dichloride complex were replaced by the same molar quantity of a complex obtained by mixing N-vinyl 2-ethyl imidazole and ethylaluminium dichloride, with a molar ratio of 1:1 at 30°C in benzene.

This produced 46 gr of a terpolymer with the appearance of an unvulcanized elastomer, amorphous in X-rays, and containing 47 percent weight of propylene, 51 percent ethylene, and 2 percent N-vinyl 2-ethyl imidazole, namely 0.46 percent of nitrogen.

When the same process was repeated, but without complexing the unsaturated nitrogen derivative, no polymer was obtained.

EXAMPLE 7

A reactor similar to the one described in Example 1 was used, and the temperature was kept at 20°C throughout copolymerization.

The funnels on top of the reactor were swept out and a nitrogen atmosphere established in them. 50 millimoles of a complex of N-vinylimidazole and ethylaluminium dichloride in 80 milliliters of benzene, prepared as described in Example 1, were placed in the monomer-inlet funnel.

Two millimoles of $VOCl_3$ were placed in one of the catalyst-system funnels, and 10 millimoles of diethylaluminium chloride in the other, each diluted in 60 milliliters of benzene.

750 milliliters of anhydrous benzene were placed in the reactor, inside which a nitrogen atmosphere was maintained. The flow of nitrogen was stopped, and a mixture of ethylene and 1-butene, in the molar ratio of 1-butene to ethylene of 2, was injected through the gas-inlet tube. This mixture circulated at a rate of 100 normal liters an hour throughout copolymerization.

After 20 minutes' saturation of the solvent by the gaseous mixture, the complexed nitrogen monomer and catalyst system components were fed in continuously, each over a period of 60 minutes.

30 minutes after injection of the catalysts, polymerization was halted by adding 20 milliliters of ethanol. The contents of the reactor were then poured into ethanol to coagulate the polymer, which was then washed in ethanol and in hot water, and dried in a drier at approximately 50°C.

The reaction produced 40 gr of a terpolymer amorphous in X-rays, and containing 40 percent weight of 1-butene-derived groups, 58.5 percent ethylene-derived groups, and 0.45 percent nitrogen, corresponding to 1.5 percent N-vinylimidazole-derived groups.

EXAMPLE 8

3.6 liters of anhydrous benzene were injected into a 6-liter reactor of the type described in Example 1, heat-controlled to 30°C, with a nitrogen atmosphere inside, and with a stirring system operating. The flow of nitrogen was stopped, and the benzene was saturated with a mixture of ethylene and propylene in a molar ratio of propylene to ethylene of 1.2. This mixture circulated at the rate of 100 normal liters an hour.

After saturation of the benzene, and without interrupting injection of the olefins, 200 millimoles of 5-ethylidene 2-norbornene, 200 millimoles of an N-vinylimidazole and ethylaluminium dichloride complex, prepared as described in Example 1, together with 8 millimoles of $VOCl_3$ and 96 millimoles of ethylaluminium sesquichloride, were injected continuously into the reactor, over a period of 150 minutes.

All the non-gaseous compounds injected into the reactor were diluted in benzene, so that the total volume of benzene in the reactor was 4 liters.

When the reaction was over, an antioxidant solution was added to the contents of the reactor, and the catalysts were deactivated with ethanol. The polymer that had formed was collected by steam stripping of the volatile components of the solution of polymer in benzene.

This produced 220 gr of tetrapolymer, amorphous in X-rays, and with the appearance of an unvulcanized elastomer. The viscosimetric molecular mass, based on measurement of reduced viscosity of the polymer in tetraline at 135°C, was 76,000.

This tetrapolymer contained 0.4 double bonds per 100 gr, namely 4.8 percent weight of 5-ethylidene 2-norbornene-derived groups, as well as 0.51 percent nitrogen, corresponding to 1.7 percent N-vinylimidazole-derived groups, with 48 percent propylene-derived groups and 45.5 percent ethylene-derived groups.

EXAMPLE 9

A 1,000 milliliter reactor of the same type as described in Example 1 was used, with an additional dropping funnel for the injection of an unconjugated diene. The reactor was submerged in a heat-controlled bath, and its temperature kept at 0°C.

30 millimoles of dicyclopentadiene, diluted in 60 milliliters of heptane, were placed in the diene-inlet funnel, and 50 millimoles of the N-vinylimidazole and ethylaluminium dichloride complex described in Example 1, diluted in 60 milliliters of benzene, were placed in the monomer-inlet funnel. 4 millimoles of $VOCl_3$ were placed in one of the catalyst inlet funnels, and 60 millimoles of ethylaluminium sesquichloride in the other, each diluted in 60 milliliters of heptane.

630 milliliters of anhydrous heptane were placed in the reactor, inside which a nitrogen atmosphere was maintained. The flow of nitrogen was stopped, and a mixture of ethylene and propylene, in a molar ratio of propylene to ethylene of 2, was fed in through the gas-inlet tube. This mixture circulated at a rate of 100 normal liters an hour.

30 minutes after the gas mixture had begun to be fed in, the molar ratio of propylene to ethylene was changed to 1 without altering the overall flow-rate, and the dicyclopentadiene, complexed nitrogen polymer, and each of the catalyst system components were injected drop by drop, over a period of 60 minutes.

Polymerization was then halted, and the polymer separated from the reactive mixture, purified and dried, as described in Example 1.

This produced 87.5 gr of a substance amorphous in X-rays, and with the appearance of an unconjugated elastomer.

This substance was a tetrapolymer containing 45 percent weight of ethylene, 49.5 percent propylene, 0.52 percent nitrogen, namely 1.75 percent N-vinylimidazole, and 4 non-aromatic double bonds per 1,000 carbon atoms, corresponding to 3.75 percent weight of dicyclopentadiene.

The tetrapolymer was then vulcanized by mixing 100 parts weight of it in a roller mixer with 50 parts weight of HAF carbon black, 5 parts zinc oxide, 2 parts sulphur, 1 part mercaptobenzothiazole and 2 parts tetramethylthiurame disulphide.

This mixture was heated to 155°C for 1 hour, in a press.

The vulcanized product had the following mechanical properties:

| | |
|---|---|
| - tensile strength | 140 kg/cm2 |
| - elongation at break | 320 % |

EXAMPLE 10

The same conditions applied as in Example 1, except that the N-vinylimidazole and ethylaluminium dichloride complex was replaced by a complex obtained by reaction in toluene at 0°C of N-vinylimidazole and aluminium trichloride, in a molar ratio of 1:1, and the toluene was used as the reaction medium for polymerization.

This produced 35 gr of a terpolymer with the appearance of an unvulcanized elastomer, amorphous in X-rays, and with a reduced viscosity, measured in decaline at 135°C, of 0.815.

This terpolymer contained 0.28 percent weight of nitrogen, namely 0.94 percent of N-vinylimidazole-derived groups, 43 percent propylene-derived groups and 56 percent ethylene-derived groups.

EXAMPLE 11

The same operating procedure was performed as in Example 10, except that the N-vinylimidazole and aluminium trichloride complex was replaced by a complex obtained by reaction in toluene at 0°C of N-vinylimidazole and boron trifluoride etherate ($BF_3$ $(C_2H_5)_2 O$ ) in a molar ratio of N-vinylimidazole boron trifluoride of 1:1.

This produced 30 gr of a terpolymer amorphous in X-rays, and containing 0.32 percent weight of nitrogen, namely 1 percent N-vinylimidazole-derived groups, 42 percent propylene-derived groups and 57 percent ethylene-derived groups.

What is claimed is:

1. A process for the preparation of substantially linear, amorphous, random copolymers of mono-olefins, or mono-olefins and unconjugated dienes, with a member selected from the group consisting of N-vinylimidazole, N-vinylimidazoline, ring substituted N-vinyl-imidazoles and ring substituted N-vinylimidazolines wherein the substituents are hydrocarbon radicals and amino-hydrocarbon radicals, comprising contacting at least two mono-olefins containing from 2 to 20 carbon atoms in their molecule or at least two such mono-olefins and said unconjugated diene in a liquid medium at a temperature of between −80° to 150°C with at least one of the said members in the form of a complex with a Lewis acid, in the presence of the catalyst system formed by the combination of an organometallic compound of at least one metal in column I, II or III of the periodic table of elements with a compound of a transition metal in columns IV to VIII of said periodic table at a ratio of the number of atoms of the first metal to the number of atoms of the second metal of between 1 and 50, to obtain the desired copolymer.

2. A process as defined in claim 1, in which the monoolefins have the general formula R-CH = $CH_2$, where R represents one of a pair comprising hydrogen and an alkyl radical containing 1 to 18 carbon atoms.

3. A process as defined in claim 2, in which the olefins are ethylene combined with an alpha-olefin containing 3 to 8 carbon atoms.

4. A process as defined in claim 3, in which the alpha-olefin is one of a pair comprising propylene and 1- butene.

5. A process as defined in claim 1, in which an unconjugated diene is included in the polymerization mixture, this diene being selected from the group consisting of 1,4-hexadiene, 2-methyl-1,4-pentadiene, 1,4-cycloheptadiene, 1,5-cyclo-octadiene, 4,7,8,9-tetrahydroindene, bicyclo-2,6-heptadiene, dicyclopentadiene and 5-alkylidene-2-norbornenes.

6. A process as defined in claim 1, in which said member is selected from the group consisting of N-vinylimidazole, N-vinylimidazoline, ring substituted N-vinylimidazoles and ring substituted N-vinylimidazolines wherein the substituents are alkyl, aryl, aralkyl and alkaryl radicals, and corresponding aminoradicals, containing from 1 to 8 carbon atoms or a hydrocarbon or aminohydrocarbon divalent radical containing 4 to 8 carbon atoms, borne by the two adjacent carbon atoms of the ring and forming a hydrocarbon nucleus with them.

7. A process as defined in claim 6, in which the hydrocarbon nucleus is an aromatic nucleus.

8. A process as defined in claim 6 in which said member is selected from the group consisting of N-vinylimidazole, N-vinylbenzimidazole, N-vinylimidazoline and N-vinyl-2-ethyl imidazole.

9. A process as defined in claim 1 in which the Lewis acid used to complex said member is selected from the group consisting of alkyl aluminum dihalides, aluminum trihalides, boron halides, tin halides and nickel halides.

10. A process as defined in claim 9, in which the Lewis acid is selected from the group consisting of alkyl aluminum dichlorides, aluminum trichloride and boron trifluoride.

11. A process as defined in claim 10, in which the alkyl aluminum dichloride is ethylaluminum dichloride and the boron trifluoride is boron trifluoride etherate.

12. A process as defined in claim 1, in which the catalyst system is formed by the combination of one of a pair comprising an organoaluminum and a halogenated organoaluminum compound and one of a pair comprising vanadium halide and oxyhalide.

13. A process as defined in claim 12, in which said vanadium halide and oxyhalide is complexed by an organic ligand.

14. A process as defined in claim 1, in which the inert liquid medium in which copolymerization takes place is selected from the group consisting of aliphatic, aromatic, cycloaliphatic hydrocarbons and corresponding halogenated hydrocarbons.

15. A process as defined in claim 1, in which the polymerization temperature is between −30° and +100°C.

16. A substantially linear, amorphous random copolymer, characterized by the fact that it contains 99.9 to 80% weight of non-polar groups from at least 2 mono-olefins containing 2 to 20 carbon atoms in their molecule or at least 2 such mono-olefins and an unconjugated diene, and 0.1 to 20 percent polar groups from at least 1 member selected from the group consisting of N-vinylimidazole, N-vinylimidazoline, ring substituted N-vinylimidazoles and ring substituted N-vinylimidazolines wherein the substituents are hydrocarbon radicals and amino-hydrocarbon radicals.

17. A copolymer as defined in claim 16, in which said member is selected from the group consisting of N-vinylimidazole, N-vinylimidazoline, and ring substituted N-vinylimidazoles and ring substituted N-vinylimidazolines wherein the substituents are aryl, alkyl, aralkyl, alkaryl radicals and amino radicals, containing 1 to 8 carbon atoms, or a hydrocarbon or amino-hydrocarbon divalent radical containing 4 to 8 carbon atoms, borne by the 2 adjacent carbon atoms of the ring and forming a hydrocarbon nucleus with them.

18. A copolymer as defined in claim 17, in which the hydrocarbon nucleus is an aromatic nucleus.

19. A copolymer as defined in claim 17, in which said member is selected from the group consisting of N-vinylimidazole, N-vinylbenzimidazole, N-vinyl-2-ethyl imidazole and N-vinyl-imidazoline.

20. A copolymer as defined in claim 16, in which the nonpolar groups consist of units from at least 2 olefins with the formula $R-CH=CH_2$, where R represents one of a pair comprising hydrogen and an alkyl radical containing 1 to 18 carbon atoms.

21. A copolymer as defined in claim 20, in which the nonpolar groups consist of units from ethylene and an alpha-olefin containing 3 to 8 carbon atoms.

22. A copolymer as defined in claim 21, in which the nonpolar groups consist of units from one of two pairs comprising ethylene and propylene, and ethylene and 1-butene, and in which the proportion of propylene or 1-butene-derived groups can vary between 5 and 75 percent of the weight of copolymers, and the ethylene content is not more than 75 percent of the weight of the copolymer.

23. A copolymer as defined in claim 16, in which the nonpolar groups also contain units derived from an unconjugated diene, the proportion of which is not more than 20 percent of the weight of copolymers.

24. A copolymer as defined in claim 19, in which the unconjugated diene is selected from the group consisting of dicyclopentadiene, a 5-alkylidene-2-norbornene, 1,4-hexadiene 2-methyl-1,4-pentadiene, 1,4-cycloheptadiene, 1,5-cyclooctadiene, 4,7,8,9-tetrahydroindene and bicyclo-2,6-heptadiene.

25. A copolymer as defined in claim 16, in which the non-polar groups represent 99.8 to 85 percent of the weight of copolymer, while polar groups represent 0.2 to 15 percent of the weight of copolymer.

26. Elastomers obtained by vulcanizing a copolymer as defined in claim 16.

27. Elastomers as defined in claim 26, vulcanized on a substrate.

28. Elastomers as defined in claim 27, vulcanized on a metal surface.

* * * * *